Figure 2:
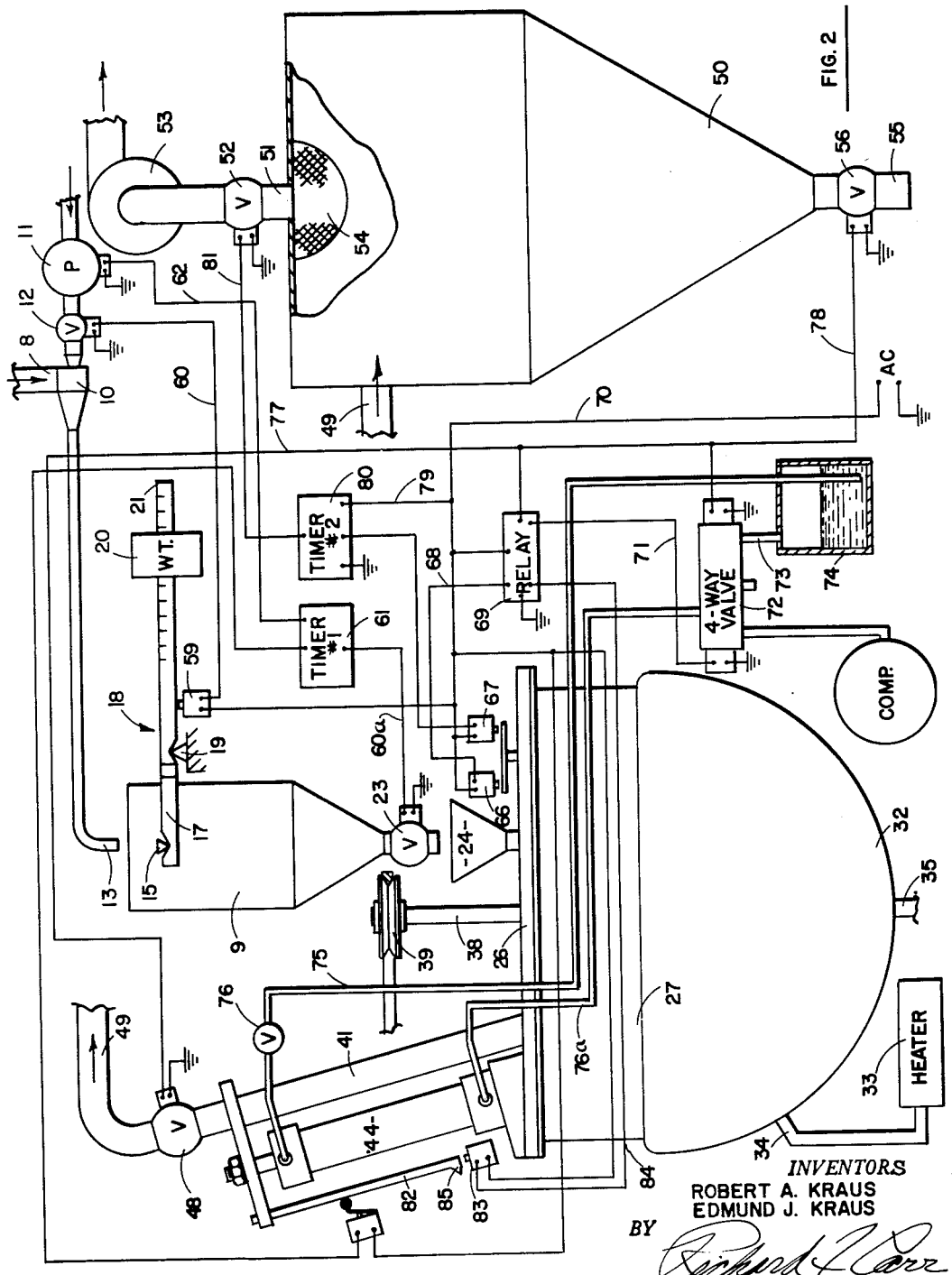

July 26, 1966    R. A. KRAUS ETAL    3,262,686
ARRANGEMENT FOR EXPANDING PLASTIC MATERIAL
Filed Aug. 9, 1963    6 Sheets-Sheet 1
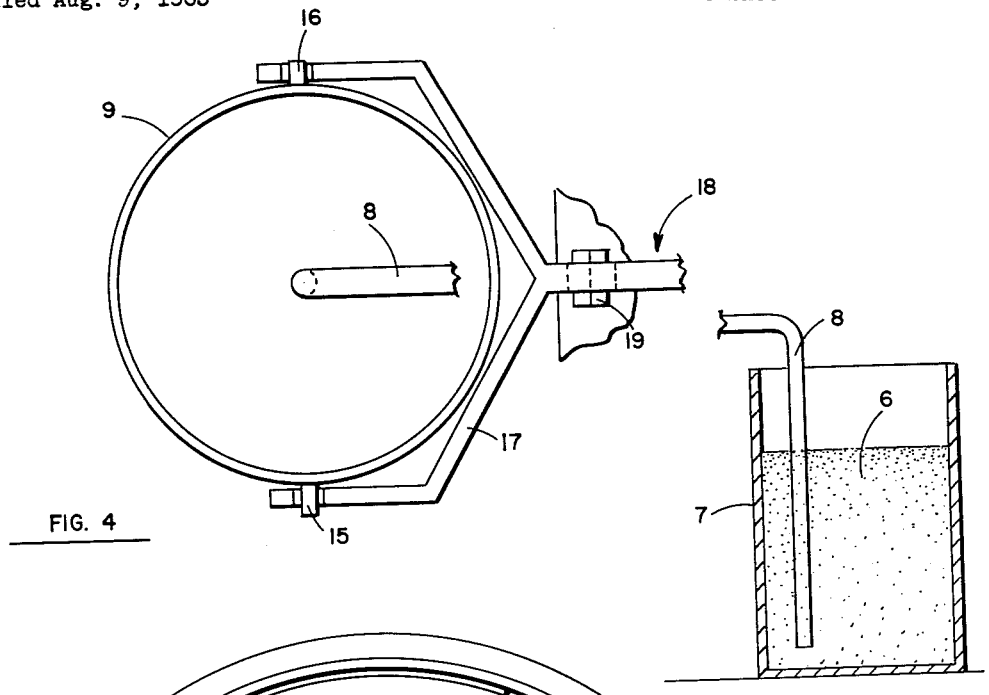
FIG. 4
FIG. 1
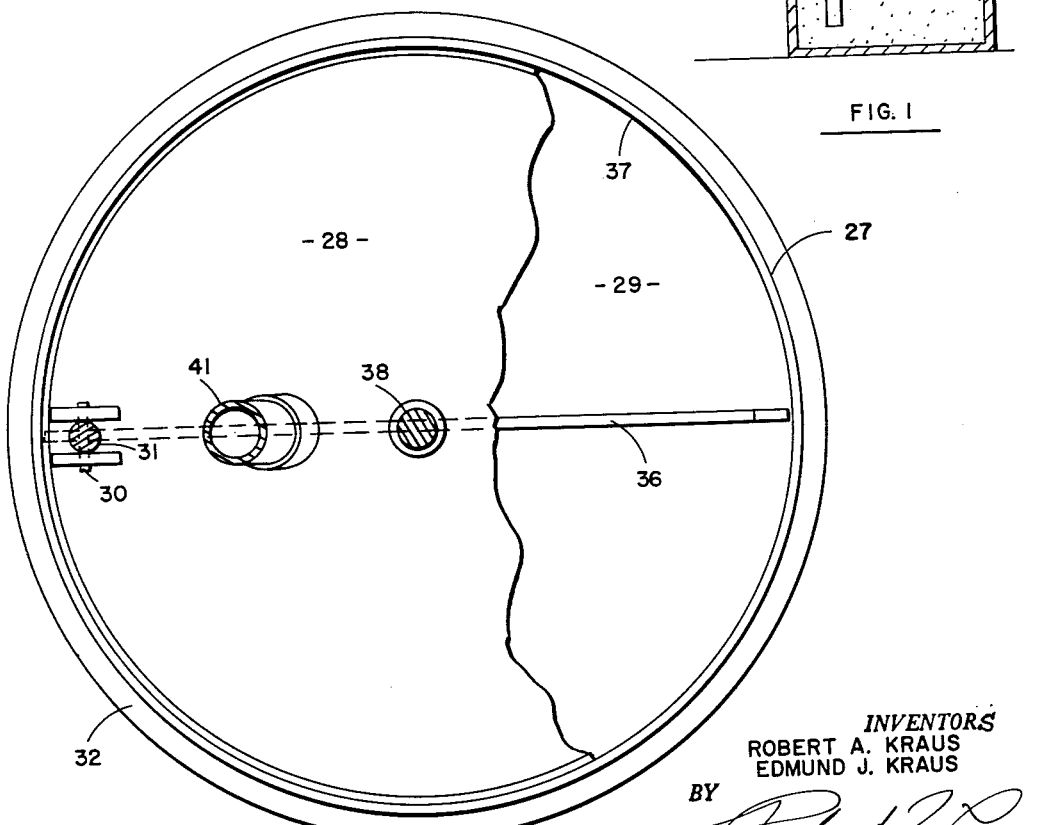
FIG. 5
INVENTORS
ROBERT A. KRAUS
EDMUND J. KRAUS
BY
ATTORNEY

INVENTORS
ROBERT A. KRAUS
EDMUND J. KRAUS
BY
ATTORNEY

July 26, 1966 R. A. KRAUS ETAL 3,262,686
ARRANGEMENT FOR EXPANDING PLASTIC MATERIAL
Filed Aug. 9, 1963 6 Sheets-Sheet 4

INVENTORS
ROBERT A. KRAUS
EDMUND J. KRAUS
BY
ATTORNEY

INVENTORS
ROBERT A. KRAUS
EDMUND J. KRAUS

BY

ATTORNEYS 3,262,686
ARRANGEMENT FOR EXPANDING PLASTIC MATERIAL
Robert A. Kraus and Edmund J. Kraus, both of 1117 Mayflower, Monrovia, Calif.
Filed Aug. 9, 1963, Ser. No. 301,942
5 Claims. (Cl. 263—21)

This application is a continuation-in-part of our copending application for Arrangement for Expanding Plastic Material, Serial No. 160,161, filed December 18, 1961, now abandoned.

This invention pertains to an arrangement for providing controlled expansion of foamable plastic pellets.

At the present time, expanded foam plastics are used to a large and growing extent in the manufacture of containers, cartons and various other items. This may be, for example, disposable drinking cups made from a considerable number of expanded foam plastic pellets fused together to form a unitary structure. This type of item is desirable not only because of its low cost which allows it to be expendable in nature, but also because of its light weight and low thermal conductivity. In addition, such containers are odorless, tasteless, nonabsorbent and nontoxic.

Commonly cups or other products are made from plastic pellets charged with a foaming agent. Generally these are small polystyrene beads, and the activating gas is methylchloride, butane, heptane, or the like.

Prior to introducing the pellets into a mold where they are to be fused into the completed article, the pellets are given a pre-expansion by elevating their temperature for a brief period. In one widely used arrangement of this sort the pellets are run through a drum where they are heated sufficiently to cause expansion. A serious difficulty has been in the lack of any control over the density of the resulting prefoamed pellets. It is critical to the production of a satisfactory article that the pellets are given a proper and uniform density. If the pellets are expanded too much, the items produced from the pellets will have little strength, and frequently will include flaws rendering them unacceptable. Furthermore, if the pellets are expanded excessively they will not pass through the narrow passageways of the mold. Too little expansion also is undesirable. This is of course wasteful and costly by utilizing too much plastic for each unit produced. The greater density means that the resulting item sacrifices insulative qualities. Therefore, for products of uniform high quality, the density of the pre-foamed pellets must be held within close limits. As a result of an inability to control the pre-expansion of the pellets used in expanded foam plastic products, therefore, production has been seriously hampered. Reject rates have been extremely high and the quality of the products so manufactured has suffered.

Another difficulty found with pellet expanding devices used heretofore arises from moisture imparted by them to the plastic beads. The usual pellet expanding device relies upon the direct application of steam as the means for raising the temperature of the pellets to cause the pre-expansion. Even hot water has been suggested as an appropriate heat transfer medium. When the pellets are subjected to the steam or water, however, a certain amount of moisture is retained by them. The porous nature of these foam particles means that they have considerable affinity for fluids. Even when the added step of drying the pellets subsequent to pre-expansion is introduced into the production cycle, it has been found that not all of the moisture can be driven off.

Probably the most serious effect of the liquid contained in the foam plastic pellets is the attendant increase in the time necessary to manufacture the completed fused article in the mold. It is necessary to raise the temperature of the pellets to the neighborhood of 230° F. in order to fuse the beads into a unitary structure. However, in view of the moisture content of pellets subjected to pre-expansion by the devices of the prior art, it has been impossible to increase the temperature above 212° F. until such time as the water is vaporized and driven off. The result is an appreciable time interval before the fusion temperature can be reached, giving a marked increase to the production time compared with the case where dry pellets are utilized. This extra production time has a very serious consequence in decreasing the output of the completed product and adding to the cost of its manufacture.

The water content of the plastic pellets also makes them more difficult to handle, in some instances causing the pellets to clog up the equipment. For example, the pellets are graded according to size before being introduced into the mold. Normally, the grader is made up of screens of different meshes, to transmit pellets within acceptable size limitations while rejecting the others. Moist pellets tend to agglomerate so that they will not pass through the grader in the intended manner.

The water content of the pellets also tends to rust the production equipment. As a consequence, it has been the practice to utilize expensive stainless steel throughout the machinery to overcome the corrosion problem.

The conventional expander utilizing steam is quite difficult to control. Usually the steam enters as a jet and is mixed with air. In many instances, it becomes virtually impossible to hold the resulting temperature within acceptable limits. Mixing of the steam and air may be nonuniform so that hot spots in the expander result. Normally steam at around 320° F. is used and this hot fluid easily can cause the pellets to expand excessively as it contacts them. As a result, some of the pellets may be expanded improperly, and again the equipment may become clogged when steam is used as the heating medium.

According to the present invention all of these shortcomings are obviated and the density of the pre-expanded pellets is controlled with precision. This is accomplished first by weighing a measured amount of the unexpanded pellets which then are introduced into a heated vessel. Expansion then takes place until the volume of pellets fills the chamber. The pellets then bear against a pivotal movable element of the vessel which thereby is caused to trip a switch that actuates a mechanism to remove the pellets as the expansion cycle is ended. Preferably, after the pellets leave the heated chamber, they are air cooled to cut off subsequent expansion from residual heat. Thus by controlling the weight of pellets used and the volume of the expanded pellets, an exact density value may be obtained. Density variations are obtained by controlling the weight of the pellets introduced into the heating chamber, and the entire unit is operable automatically. In another version of the invention the pellets flow continuously through the expander with the rate of feed into the unit being variable to control the pellet density. Again the pellets are kept dry as they are given their pre-expansion.

Therefore, it is an object of this invention to precisely control the expansion of foamable plastic material.

Another object of this invention is to control the density of foam plastic pellets for use in molding.

An additional object of this invention is to provide an expander and density control arrangement that is automatic in operation.

A further object of this invention is to provide a foam plastic expander that is adjustable to allow securing of various densities.

Yet another object of this invention is to provide a device for expanding foam plastic pellets in which heat for causing expansion is applied uniformly and directly to a quantity of plastic pellets.

A still further object is to provide for the expansion of foam plastic pellets without adding moisture to the pellets.

Figure 3:
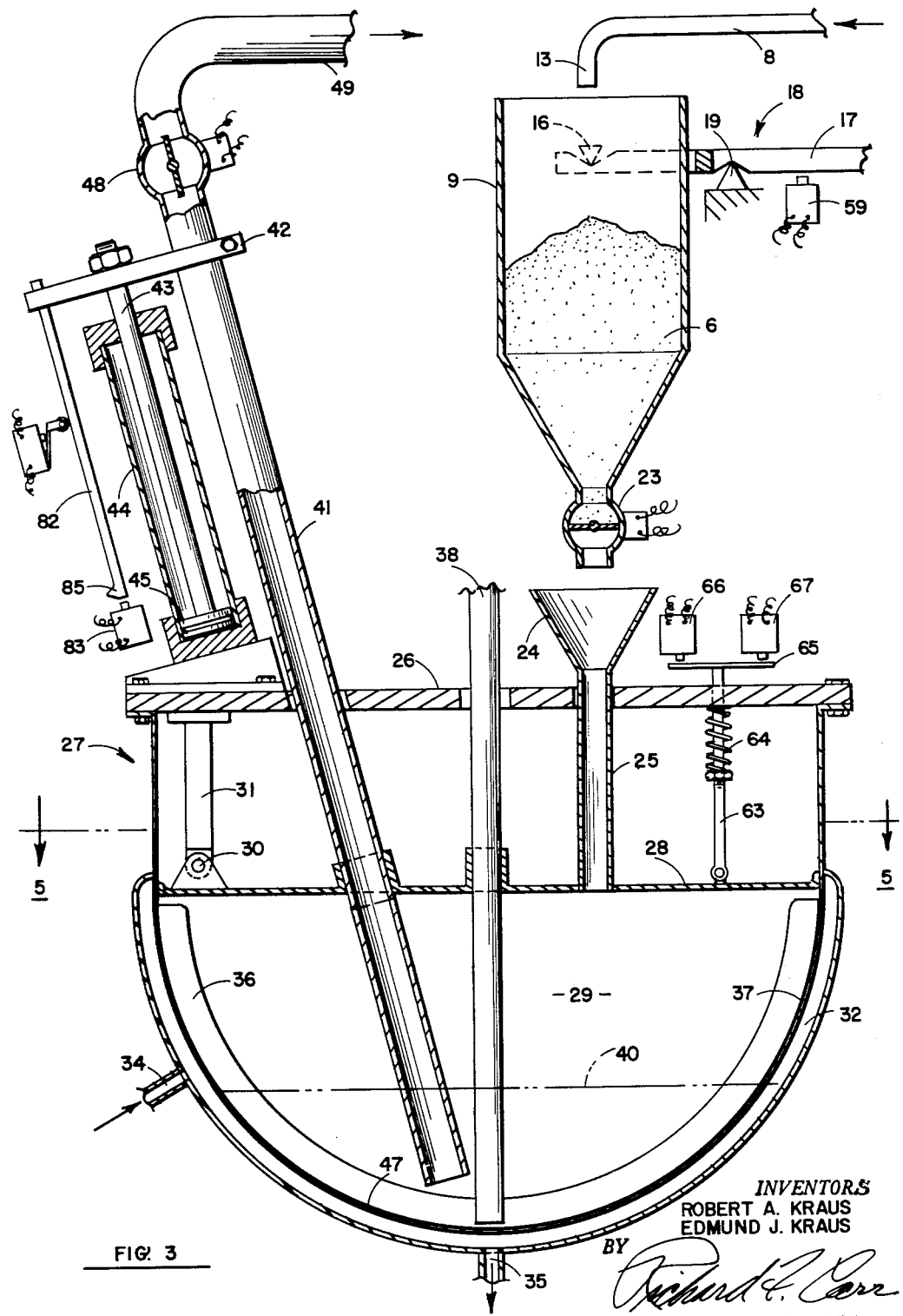

These and other objects will become apparent from the following detailed description taken in connection with the accompanying drawing in which:

FIG. 1 is a sectional view illustrating the drum of pellets to be conducted to the expanding apparatus, FIG. 2 is an elevational view, partially schematic, showing the overall arrangement of the components of this invention, FIG. 3 is an enlarged sectional view of the expansion chamber and related elements, FIG. 4 is a fragmentary top plan view illustrating the suspension of the feed hopper by the balance beam, FIG. 5 is a transverse sectional view, partially broken away, taken along line 5—5 of FIG. 3, showing the arrangement of the pivotal lid with respect to the expansion chamber.

Figure 6:
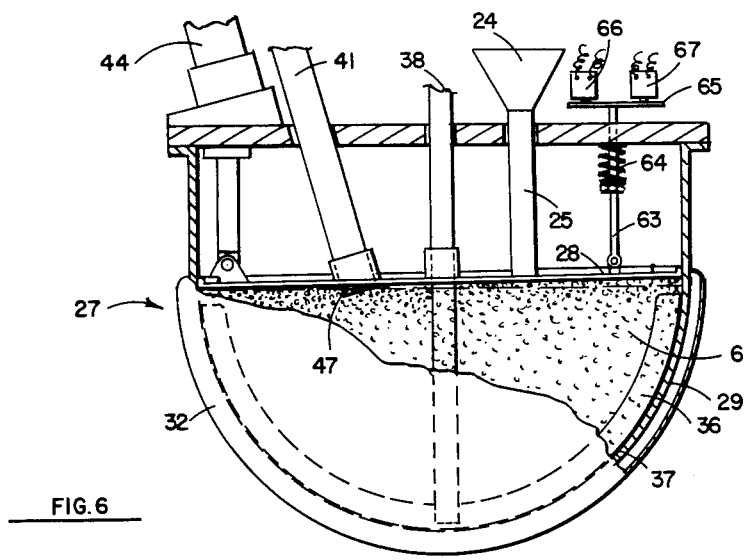
Figure 7:
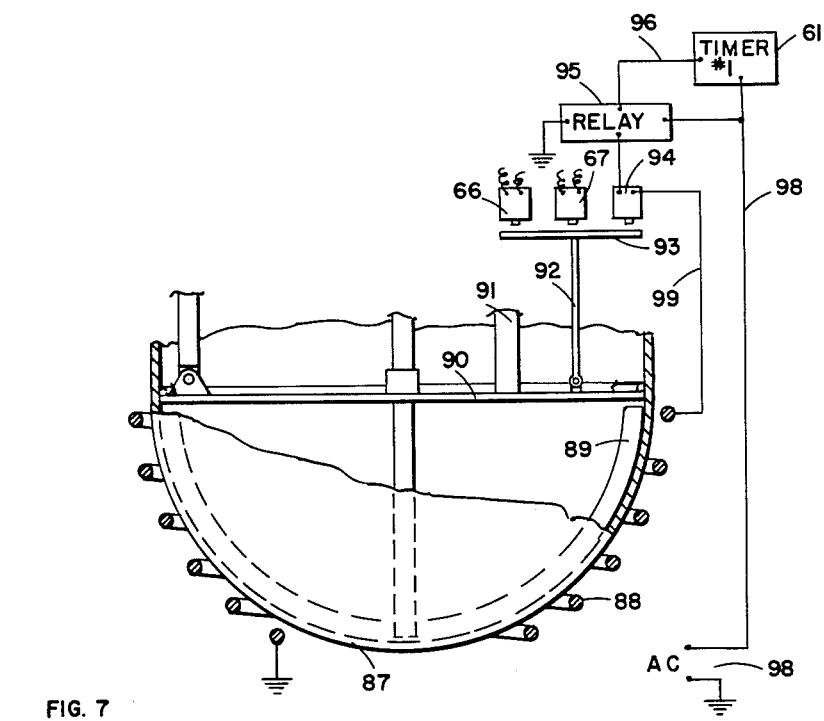
Figure 8:
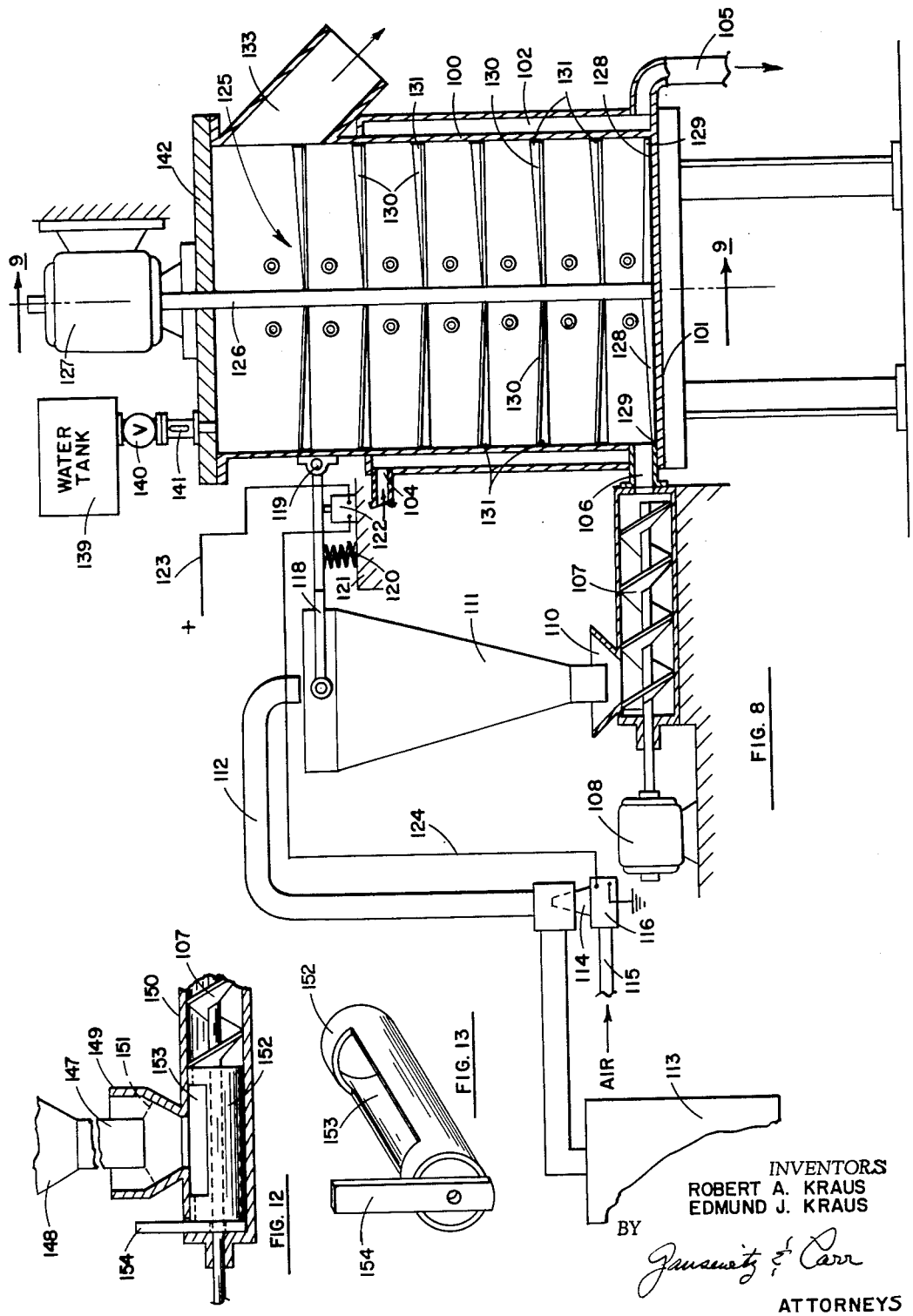
Figure 9:
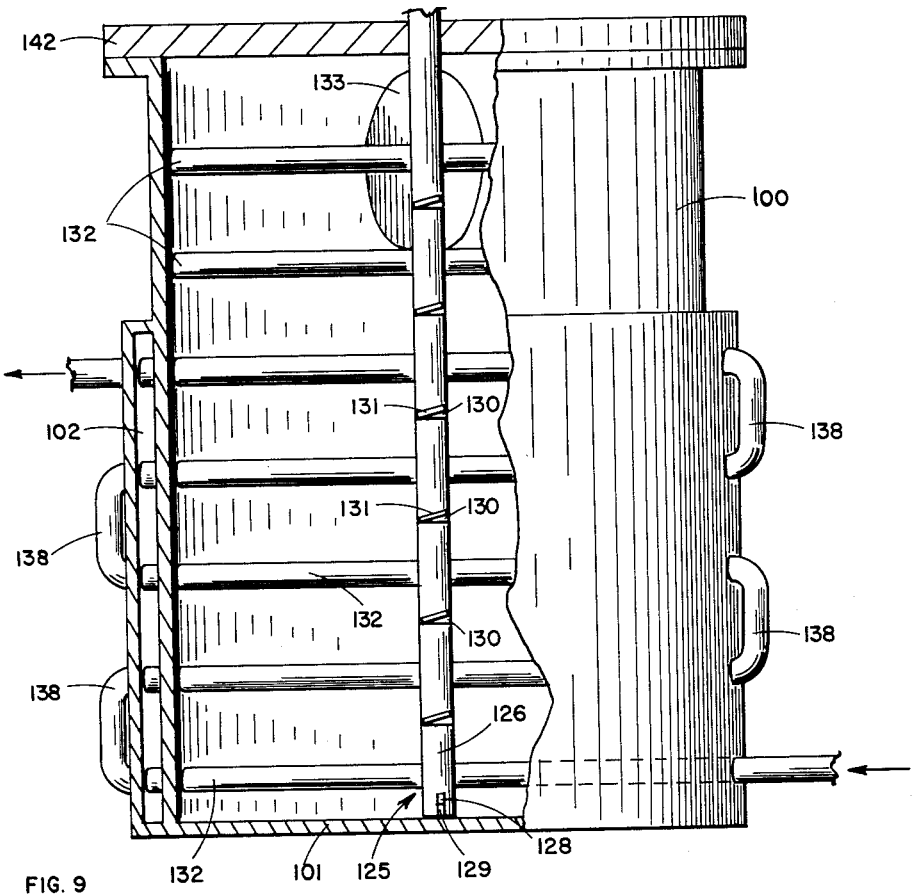
Figure 10:
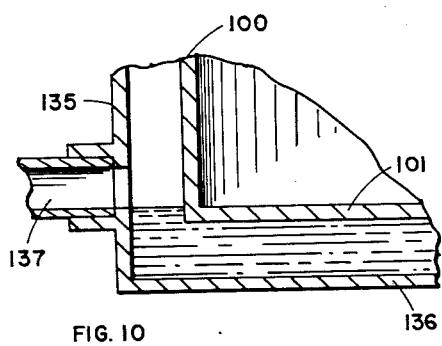

FIG. 6 is a sectional view of the expansion chamber showing the movement of the pivotal lid by the contents of the chamber, FIG. 7 is an elevational view of an alternate arrangement for imparting heat to the pellets, FIG. 8 is a sectional view of a modified form of the expander of this invention in which there is a continuous flow of pellets into and out of the unit, FIG. 9 is an enlarged fragmentary sectional view taken along line 10—10 of FIG. 9, FIG. 10 is a fragmentary sectional view illustrating a different arrangement for heating the expansion chamber.

Figure 11:
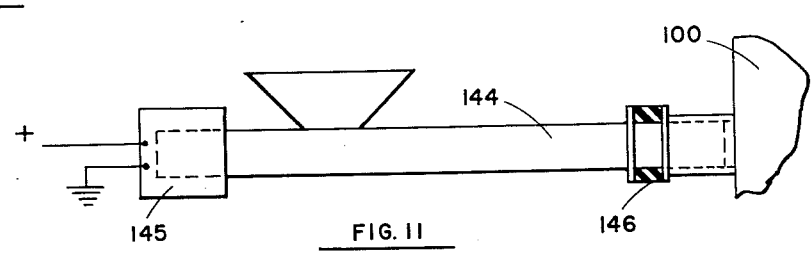

FIG. 11 is a fragmentary elevational view of a different feed arrangement for the embodiment of FIG. 9 in which a vibrator is used to impart motion to the pellets, and FIG. 12 is a fragmentary sectional view of a simplified pellet supply arrangement for the feed screw, and FIG. 13 is a perspective view of the valve member of the design of FIG. 12.

With reference to the drawing, the foamable plastic pellets 6, which may be partially expanded polystyrene material, first are sorted according to size and retained in a supply drum 7 (seen in FIG. 1). It is these pellets that are to be given a controlled pre-expansion in accordance with the teachings of this invention, prior to being fused into completed articles.

Inserted into the drum 7 is a tube 8 which is used to conduct pellets from the drum 7 into a hopper 9. In view of the inherent light weight of the plastic pellets, a vacuum is conveniently utilized in moving the pellets from one location to another. Thus, as shown in FIG. 2, an ejector pump 10 is located in the conduit 8 and supplied with air from a blower 11 so as to draw the pellets from the drum. A solenoid operated valve 12 may be used to control the output of pump 10. When there is a flow of air from the blower 11, and valve 12 is open, the pump 10 will draw the pellets from the drum 7 so that they are conducted through line 8 and dropped out of the end 13 of this line into the open upper end of the hopper 9.

Hopper 9 is suspended by knife-edge support brackets 15 and 16 projecting radially outward from the hopper and resting on bifurcated end 17 of a balance beam 18. The beam in turn is pivotal about a fixed fulcrum 19 and counterbalanced by means of weight 20 slidable along calibrated end portion 21 of the beam beyond the fulcum. The weight 20 counterbalances the hopper 9 and its contents, and can be moved to allow a desired mass of pellets to enter the hopper at the balanced condition. In a typical example, fifteen pounds of pellets ranging from 0.008 to 0.020 inch diameter will be introduced into hopper 9.

At the lower end of hopper 9 is a solenoid-operated butterfly valve 23 controlling the outlet. Butterfly valves are used throughout the system because they will not be jammed by the small pellets as would gate or globe valves. Immediately below valve 23, as best seen in FIG. 3, is a funnel 24 at the upper end of a vertically positioned tubular conduit 25. The latter member extends through the upper wall 26 of a heated expansion chamber assembly 27. The tube 25 is carried by a lid 28 over the bottom portion 29 of the chamber 27, which may be semispherical in configuration and is of a known volume. The lid 28 extends diametrically across the expansion chamber to cover the entire upper side of the lower portion 29 of the chamber. This lid is pivotally mounted with respect to the chamber 27, being rotatable about a pin 30 which is carried by bracket 31 depending from the upper wall 26 of the chamber.

The lower portion 29 of the chamber 27 is of doublewall construction so as to provide a jacket 32 around this portion of the chamber. A heating medium, such as hot water, is circulated from heater 33 through an inlet 34 and exhausted through outlet 35. Hence, the interior of the lower portion of the chamber may be heated by conducting the heating medium through the jacket 32.

Within the lower portion 29 of the expander is a crescent-shaped agitator 36, the lower edge of which is substantially complementary to the inner wall 37 of the lower chamber portion. A shaft 38 extends upwardly from the agitator 36 through the pivotal lid 28 and the upper wall 26 of the chamber unit to a source of power for rotating the shaft. This may be an electric motor (not shown) driving pulley 39 on the upper end of the shaft. During operation of the device of this invention the drive motor keeps the contents of the lower chamber portion 29 in constant movement by continually rotating the agitator 26. This prevents the sticking of any of the pellets to the chamber wall or to each other, and assures that the pellets are mixed adequately to result in uniform heating.

It is apparent thus far, therefore, that pellets from the supply drum 7 may be fed through the tubular conduit 8 into the hopper 9. The weight of the hopper and its contents may be controlled by the balance beam 18. Therefore, either by manual weighing or by the automatic arrangement described below, a predetermined mass of pellets may be introduced into the hopper 9. This measured amount of pellets may be dropped downwardly into the lower portion 29 of the expansion chamber 27 by opening the butterfly valve 23. This permits the pellets to pass through the funnel 24 and the line 25 into the expansion chamber. Less than all of the volume of chamber portion 29 will be filled initially as the pellets come only to the level of line 30 (FIG. 3).

The pellets there are heated by the heating medium in the jacket 32, while they are kept in motion by means of the agitator 36. This heating of the pellets will cause them to expand until ultimately they fill the entire volume of the portion 29 of the unit 27, as illustrated in FIG. 6. When this occurs, the pellets will bear against the undersurface of the pivotal lid 28, causing it to rotate slightly about the pivot pin 30. This signifies that the pellets have been given a volume equivalent to that of the lower portion 29 of the chamber. The pellets may be expanded to around 0.050 inch diameter when this occurs.

In this manner it is possible to control exactly the density of the pellets in their expanded condition. First, a metered weight of the pellets is obtained which then is expanded to a predetermined volume. With weight and volume both being controlled, obviously density likewise is determined.

The pre-expanded pellets are removed from the expansion chamber by means of an outlet tube 41. This member is carried by a bracket 42 that is secured to the outer end of a piston rod 43 extending into a pneumatic cylinder 44. The piston 45 is reciprocative within the cylinder and when in its upper position will hold the tube 41 so that its lower end 47 is adjacent the undersurface of lid 28. In other words, when so retracted the tube 41 is substantially removed from chamber portion 29. Movement of the piston 45 to the opposite end of its stroke, however, will push the tube 41 downwardly into the chamber 29, positioning the lower end 47 of the tube substantially at the lowermost portion of the chamber 29, as indicated in FIG. 3.

At the upper end of tube 41 is a solenoid operated butterfly valve 48 communicating with an outlet line 49 that leads to a storage hopper 50. An air outlet line 51 extends from the upper end of the hopper 50 and is controlled by a solenoid operated butterfly valve 52. A blower 53 serves to pump air from the hopper through line 51. The opening into line 51 is covered by semispherical screen 54 of a mesh sufficiently fine to prevent the pellets from passing through it. At the lower end of the convergent bottom portion of the hopper 50 is a line 55 controlled by solenoid operated butterfly valve 56.

It can be seen, therefore, that with valves 48 and 52 open, while hopper outlet valve 56 is closed, and with the blower 53 in operation, the expanded pellets will be drawn from the chamber 29 into the tube 41 and from thence into the hopper 50. This will remove all of the expanded pellets from the chamber 29 within a few moments.

After the pellets have been pumped from the chamber 29 into the hopper 50, the valve 48 is closed while the valve 56 is opened. This permits a flow of air through the line 55 into the hopper as it is drawn by the blower 53. This air circulating through the hopper to outlet 51 passes over the expanded pellets within the hopper. As a result, the pellets are cooled instantly by the atmospheric air pumped through the hopper. This cooling immediately terminates the expansion cycle of the pellets. Thus, even though the pellets may retain heat that was imparted to them in the chamber 29, the cooling air flow through the hopper 50 will reduce their temperature to below that of expansion so that the expansion is cut off. This provides a control to assure that the pellets retain the precisely established density imparted to them by the expansion of a predetermined mass to the volume of chamber 29.

While the procedure indicated above may take place by manual manipulation of the valves and other elements of the device, operation is greatly enhanced by automatic control of the components of the invention. For that reason the valves are made to be power operated, and various other control elements are included as described below.

Located immediately below side 21 of balance beam 18 is a normally open switch 59. When the weight of side 21 over-balances that of the hopper and its contents, the beam will maintain the switch closed thereby completing the circuit through conductor 60 to valve 12. This opens the valve so that the ejector pump 10 can draw pellets 6 into hopper 9. However, when sufficient pellets have been introduced into hopper 9 to cause the beam 18 to balance, the side 21 will be raised, thereby opening the switch 59 cutting off the circuit to valve 12 causing it to close. This shuts off the supply of pellets to the hopper.

The outlet valve 23 for the hopper 9 is connected by a lead 60a to a timer 61 which controls the operation of this valve. The timer 61 directs current to open valve 23 at a time subsequent to the filling of hopper 9. The valve 23 is held open for a predetermined period of time which is adequate to allow the contents of hopper 9 to drop into chamber 29. Afterward the timer 61 will close the circuit to this valve, shifting it back to the closed position. Blower 11 for the ejector pump 10 also is connected by a conductor 62 to timer 61 so that it is controlled thereby. The timer shuts off power to the blower 11 during the time valve 23 is open so that no pellets enter hopper 9 during this period.

When the pellets within the chamber 29 are expanded to entirely fill the volume of that vessel, the lid 28 pivots about pin 30 and pushes upwardly on a rod 63 which is biased downwardly by a light spring 64. A cross arm 65 at the upper end of rod 63 simultaneously actuates a pair of normally open switches 66 and 67.

With switch 66 closed a pulse is sent through conductor 68 to the actuating coil of latching relay 69. This actuates the relay which receives current from main power line 70 and through conductor 71 completes a circuit to a four-way valve 72. This valve is solenoid operated so that the current thus provided positions the valve 72 to direct pressurized air through conduit 73 to the top of tank 74 which is partially filled with fluid such as oil. Air for this purpose enters the valve 72 from a compressor, as shown. Therefore, the pressurized air in tank 74 forces the oil through conduit 75, which includes a flow control valve 76, to the top of cylinder 44 for moving piston 45 through its downward stroke. This allows the piston to be advanced at a regulated even speed as it moves tube 41 into the chamber 29 for exhausting the pellets. Conduit 76a acts as an air exhaust as the piston is moved in this manner.

The actuation of relay 69 from the closing of switch 66 also completes the circuit through conductor 77 to the power driven butterfly valve 48, moving that valve to the open position. Hence, as the tube 41 is moved downwardly into the chamber 29, its outlet valve simultaneously is opened to permit the pellets from within the chamber to be pumped out into the hopper 50.

In addition, the relay 69 causes current to flow through lead 78 to butterfly valve 56 which closes that valve. This means that when the valve 48 is opened for permitting the pellets to be pumped from chamber 29, the outlet valve 56 of the hopper at the same time is closed so that these pellets will be retained within the hopper.

The tripping of switch 67 by the cross arm 65 causes a pulse of current to flow through electrical conductor 79 to a second timer 80. A relay is incorporated into this timer which also is connected to main power line 70. Therefore, in response to the pulse, timer 80 directs current for a predetermined period of time through lead 81 to the valve 52 in line 51. This opens the valve 52 so that the blower 53 can pump the pellets from tube 41 through line 49 into the hopper 50. The timer assures that the valve 52 is open a sufficient time to accomplish both the movement of the pellets into the hopper and the subsequent pumping of air through the hopper to effect the cooling of the pellets.

At the bottom of the stroke of the piston 45 in the cylinder 44 a rod 82, carried by bracket 42, is caused to trip a normally open switch 83. This allows current to flow through conductor 84 to the release coil of relay 69. The relay then reverses its position, interrupting the current flow through conductors 71, 77, 78 and 79.

As a result, the four-way valve 72 returns to its original position so that air from tank 74 is directed through conduit 76a to the lower end of the cylinder 44, while the line 75 now acts as the exhaust. Thus at the bottom stroke of the piston 45, the air pressure automatically reverses the operation of the piston and the tube 41 begins to rise.

The opening of relay 69 also interrupts the circuit to valves 48 and 56, closing the former and opening the latter. Therefore, as the pellets have been completely pumped into the hopper the tube 41 automatically is raised and the butterfly valves are reversed so that the blower 53 no longer pumps from the chamber 29. Instead, with valve 56 open the cooling air then comes into the bottom of the hopper, passing outwardly through line 51 to terminate the expansion cycle of the pellets within the hopper.

As the piston 45 is moved through approximately half of its upward stroke, a cam 85 on the end of rod 81 actuates normally open switch 86. With that switch closed, current flows through conductor 87 to timer 61 resulting in the opening of the outlet valve 23 of hopper 9 as described above. This gives automatic repetition of the heating and expanding cycle of the pellets.

It is apparent, therefore, that by appropriate switching and control devices the arrangement of this invention can become entirely automatic in operation. It will operate indefinitely virtually without attention, cycling to provide quantities of pellets expanded to a precisely controlled density.

In some instances it may be desirable to modify the heating arrangement for the pellets, as indicated in FIG. 7. Here, instead of using a heating jacket, high frequency induced heat is employed. This adds the advantage of rapidly heating the entire quantity of pellets within the heating chamber without relying upon the transfer of heat inwardly from the wall of the chamber. In other respects, however, the arrangement is basically the same as for the embodiment described above.

As seen in FIG. 7, the heating chamber 87 is constructed of plastic around the exterior of which is wound electrically conductive coil 88. An agitator 89, similar to agitator 36 described above, is rotatable within the vessel 87. Also, there is included a pivotal lid 90 carrying the inlet conduit 91 to receive the pellets from the supply hopper. Rod 92 is carried by the lid 90, and at its outer end includes a cross piece 93. In addition to actuating switches 66 and 67, the cross arm 93 actuates a normally closed switch 94. This switch is connected to a relay 95 which through a conductor 96 is connected to timer 61, and by lead 97 to a source of high frequency electrical current 98. An additional conductor 99 extends from switch 94 to the coil 88.

As a result of this arrangement, when timer 61 sends current to valve 23 for opening that valve so as to drain hopper 9 of its contents, it likewise sends current through conductor 96 to the relay 95. Therefore, as the pellets drop into the container 87, the relay allows high frequency current to flow through the coil 88, producing a magnetic field for raising the pellets to their temperature of expansion. In this manner, therefore, the coil rapidly heats the pellets within the chamber 87, uniformly raising their temperature throughout. The agitator 89 is not actually necessary in assuring that the heating takes place, but it is preferred to include this element to avoid any possibility of the pellets becoming clustered together. The relay 95 allows the current flow to continue through the coil 88 even after the timer 61 is no longer holding the valve 23 open.

When the pellets have been expanded sufficiently to fill the entire volume of the container 87, they engage the undersurface of the lid 90, forcing this lid to pivot as before. As the lid moves upwardly, the rod 92 causes the cross piece 93 to open the normally closed switch 94. This interrupts the circuit to the heating coil 88 and causes the relay 95 to drop out so that the high frequency current to the heating coil will not be resumed as the lid drops back. In this manner, the heating of the contents of the container 87 automatically is commenced at the time the pellets are dropped into the container and is shut off as soon as the pellets have been expanded the desired amount. As a result, not only are the pellets heated more rapidly, but the source of heat is in operation only during such time as the pellets are within the expansion chamber 87.

Another embodiment of the expander of this invention may be seen by reference to FIGS. 8 and 9. This design retains the advantage of dry heating of the foam plastic pellets, and is a continuous flow unit producing a constant output of expanded pellets particularly advantageous where high production is involved. Again, density control is very accurate and far surpasses what can be accomplished with conventional equipment.

The pellet expansion takes place within an elongated cylindrical container 100 which is provided with a flat bottom end wall 101. A jacket 102 parallels the exterior of the chamber 100, defining a passageway for a heated fluid such as steam to circulate around the end of the chamber. Hence, there is an inlet 104 along the upper wall portion of the jacket 102 while outlet 105 acts as the return line for the steam. Thus, as for the version of FIG. 1, the container may be elevated in temperature to any desired value. In larger models it is preferred to utilize hot water under pressure instead of steam as the heating fluid. This allows more precise temperatures to be reached in the expander. In either event, the contents of the container are isolated from the heating medium.

The length of the jacket 102 will depend to some extent on the rate of heating desired for the pellets fed into chamber 100. In a typical example jacket 102 will project upwardly from the bottom wall 101 a distance equal to approximately two-thirds of the length of the chamber. It should be noted that the jacket 102 does not extend across the flat bottom wall 101, which therefore will be lower in temperature than the heated cylindrical wall of chamber 100.

Unexpanded foam plastic pellets are introduced into the container 100 through a passageway 106 connecting to the lower portion of the cylindrical side wall of the chamber 100 adjacent the bottom wall 101. The unexpanded pellets are fed through the passageway 106 by means of a feed screw 107. The latter element is driven by a variable speed electric motor 108. This may be a D.C. shunt wound motor, with a solid state rectification device used to vary the voltage and thereby control the speed.

An inlet funnel 110 directs the unexpanded pellets to the feed screw, being supplied in turn by a hopper 111. The pellets enter the open top of the hopper from a conduit 112 that extends to a suitable supply chamber 113, similar to the container 7 described above, that holds the unexpanded pellets. An ejector pump 114 in the line 112, supplied by air from line 115, draws the unexpanded pellets from the storage vessel 113 and pumps them to the hopper 111. A valve 116 is included to control operation of the ejector pump.

Preferably the ejector pump 114 is operated automatically and intermittently. Accordingly, the hopper 111 is suspended from a fixed support, such as the wall of the container 100, on an arm 118 pivotal about mounting pin 119. A compression spring 120 is located beneath the arm 118 and mounted on a fixed bracket 121. Also carried on the bracket 121 is a switch 122 which is disposed immediately below the pivotal arm 118. This is a normally closed switch, which by conductor 123 is connected to a source of electrical energy. Lead 124 extends from the switch to the solenoid operated valve 116.

When the hopper 111 is empty or contains only a relatively small quantity of the unexpanded pellets, the spring 120 exerts a sufficient force to move the arm 118 upwardly away from switch 122. In this position the switch 122 assumes its normally closed position so that current flows to the valve 116 and opens it so that the ejector pump is in operation. This allows the unexpanded pellets to be pumped through line 112 to the hopper 111. Then as the hopper 111 begins to fill, the heavier contents of the hopper ultimattly will overcome the force of the spring 120. This will move the arm 118 downwardly causing it to trip the switch 122. Consequently, the switch is opened interrupting the circuit to the valve 116 which closes the valve. This stops the flow of pellets to the hopper. Thus, the supply of unexpanded pellets to the feed hopper 111 is controlled automatically. In this manner the hopper 111 normally will be maintained from two-thirds to three-fourths full of the unexpanded pellets. While shown as controlling a valve at the ejector pump, the switch 122 could be used as well to start and stop the air compressor supplying line 112.

Within the container 100 there is located an agitator 125 driven by shaft 126 which in turn is rotated by motor 127. The shaft 126 extends vertically along the axis of the container 100. At the lower end of the shaft 126 are agitator arms 128 consisting of a pair of oppositely-extending flat blades arranged with their wider sides aligned with the longitudinal dimension of the chamber 100. The lower edge of each of these blade members is immediately above the bottom wall 101 and parallel to it. The outer tip ends 129 of the blades 128 extend to close proximity with the circumferential wall of the chamber 100. The blades 128 taper in width from the shaft 126 to their tip ends, and hence, the upper edges of these blades are inclined slightly downwardly from the inner end to the outer.

Above the bottom blades 128 are additional radial arms 30 also projecting in opposite directions from the shaft 128 and distributed at intervals along its length. The blades 130 are twisted slightly in the transverse dimension. The inner edges of the blades 130 adjacent the shaft 126 are substantially horizontal, but they are bent progressively transversely so that they are inclined from one longitudinal edge to the other at the outer portions, as best seen in FIG. 9. In a typical embodiment, the angle of inclination alpha at the blade tips 131 is around 15°. With the blades twisted as shown in the drawing, the shaft is intended for rotation in a clockwise direction as viewed from above. This means that the leading edge of each blade is lower than its trailing edge. As for the blades 128, the tips of blades 130 extend to the circumferential wall of the chamber 100.

In addition to the blades on the rotatable shaft 126, fixed arms 132 project from the container wall intermediate the arms 130 and above the bottom blades 128. The stationary and rotating arms cooperate to provide mixing of the pellets in the chamber 100 when the shaft is being turned.

In operation of the device, therefore, the unexpanded pellets are introduced into the chamber 100 by means of the rotating screw 107, being fed in immediately above the bottom wall 101. In the chamber the pellets receive heat by conduction from the steam or hot water passing through the jacket 102. This heat causes the pellets to expand as desired.

When the pellets in the bottom portion of the container become expanded from the heat from the steam, their density naturally decreases. Consequently, the expanded pellets rise in the container 100. Ultimately they reach the outlet tube 133 at the top portion of the container where they are removed and sent to the mold for forming a fused article. During their progress upwardly through the container the pellets are kept in relative movement by the agitator 125. As the agitator is rotated, the bottom blades 128 sweep the lower radial wall 101 of the expansion chamber so that none of the pellets will tend to remain on this surface. Thus, the blades 128 set the pellets in motion at the bottom of the container. The outwardly tapering configuration of the blades 128 reduces the load upon them and hence minimizes the torque requirements.

Similarly, the other blades 130, together with the fixed arms 132, maintain the agitation of the pellets throughout their upward movement. The inclination given to the blades 130 by the transverse twist along their length is important in assuring that the pellets will pass through the expander without agglomerating. With the trailing edge being raised with respect to the leading edge of the blade, each blade tends to lift the pellets upwardly as it rotates through the container. Hence, the pellets are directed toward the top of the container, and the action of the blades tends to separate and aerate the mass of pellets within the container. The twisting of the blades progressively toward the tips reduces the torque imposed on the agitator, as compared with the technique of inclining the blades uniformly throughout their lengths. At the same time, the blades assure that the pellets are kept in constant relative motion. Experiments have shown that, unless the inclination is given to the agitator blades of this type of expander, as discussed above, there is a tendency to pack down the pellets within the container. Consequently, without blade inclination large quantities of the pellets will stick together and the machine becomes unsatisfactory for effective quantity production. The twisting of the blades, however, alleviates this condition and results in a design where agglomeration simply does not occur. Hence, at all times there is a thorough mixing and a constant movement of the pellets so that they do not agglomerate.

The expansion and upward flow of the pellets described above takes place continuously as pellets are fed steadily into the unit through the line 106, being heated in the lower portion of the container and rising upwardly to the outlet 133. Hence, rather than producing pre-expanded pellets in batches as in the preivously described arrangement, the pellets in the embodiment of FIGS. 8 and 9 are expanded uninterruptedly.

This embodiment of the invention retains the advantage of a dry source of heat for the pellets. The steam jacket around the container is entirely separated from the contents so that the pellets never are brought into contact with moisture. Moreover, the agitator 125 keeps the pellets thoroughly mixed which assures that the pellets will not tend to stick together, and that the pellets will be expanded uniformly and only to the proper degree.

With the bottom wall 101 flat and at a lower temperature than the sides of the container 100, the weight of the beads at the bottom will not result in adhesion of the beads at the lower end of the container. If the bottom wall were heated, the pellets would fuse on the lower blades of the agitator. An unheated bottom wall will reach a thermal equilibrium around 15° F. below that of the side walls when the sides are maintained at about 250° F.

In some instances where more heating of the pellets is desired the steam jacket may be constructed as seen in FIG. 10. Here the jacket 135 is located along the cylindrical wall of the container, connecting to a jacket portion 136 that extends beneath the lower end wall 101 of the expander. An outlet 137 connects to the jacket 135 and is located at its lower edge just above the bottom wall 101. The outlet 137 leads to a steam trap. Consequently, when steam is circulated in the jacket 135, the condensate will run to the lower jacket portion 136 where it will collect beneath the steam trap outlet 137. Therefore, there will be water in contact with the bottom end wall 101 of the container 100. This hot water will maintain wall 101 at a temperature higher than when jacket 136 is absent, yet still lower than the side wall which is in contact with steam.

The absence of curvature at the bottom wall is important, as well as the lower temperature for it, in avoiding agglomeration of pellets in that zone. Additionally, the feeding of the pellets into the chamber along the bottom wall is instrumental in securing proper performance of the unit. In this manner, the pellets will be enabled to circulate upwardly and continuously as their density decreases from expansion. No beads will be trapped in a localized area and all will be given full movement through the length of the expander.

Performance of the expander is enhanced if additional heat is imparted to the pellets as they rise upwardly in the chamber 100 toward the outlet 133. This may be accomplished by maintaining at least a portion of the mixing arms of the agitator at an elevated temperature, it generally being more feasible if the stationary arms 132 are heated. When this is done the arms 132 do more than cooperate with the rotating arms 130 to effect mixing of the pellets. When heated, arms 132 also assist in the expansion of the pellets, considerably increasing the available heat transfer area within the expander. This speeds the output of the expander and permits pellets of lower density to be obtained.

One particularly effective arrangement for heating the stationary arms 132 is to construct them as a continuous tube, as best seen in FIG. 9, adapted to conduct steam or other heated fluid. Thus, the arms 132 are defined by straight tubular sections extending through the vessel 100 as chords of the circumferential wall. The ends of these straight sections are interconnected by outer portions 138. In this manner a continuous passageway is defined, adapted to transmit the heating fluid as it circulates back and forth across the container. In a typical installation there will be two rows of the arms 132, as can be seen in FIG. 8, and they may be rather closely spaced at around one inch apart in the direction of the axis of container 100.

In this manner substantially the entire length of the vessel 100 is made effective in transmitting heat to the pellets to be expanded, and the expansion process can continue throughout the travel of the pellets through the container. A large heat exchange surface area results, permitting the pellets to be explained to any desired density while maintaining a high output rate. At the same time, arms 132 perform the added function of cooperating with the movable arms 131 in agitating the pellets within the container to prevent their agglomeration.

It has been found that if all of the stationary arms 132 are heated the beads will retain a charge of static electricity when they leave the container. This makes it difficult to handle the pellets for subsequent fusion into a completed article. However, if the uppermost rods 132 are left unheated the static charge will be reduced materially. Hence, normally there is no provision for heating the upper few rods 132.

In some instances it is preferred to add minor amounts of moisture to the expanded pellets at the time they leave the expander. This is to reduce further the charge of static electricity of the pellets, making them easier to handle and to utilize in the molding equipment. Only a very small amount of water is added for this purpose, however, and the process remains essentially a dry one in which the fluidheating medium, such as steam or hot water, does not contact the pellets in effecting the expansion of them. The minor quantity of water added to reduce static electricity, therefore, does not become absorbed by the pellets in any appreciable amount.

The water addition may be accomplished by means of a small reservoir 139 located at the top of the container, having a valve 140 controlling its outlet that includes a sight glass 141 and connects to the lid 142 of the container 100. The valve is opened sufficiently to allow a few drops of water to drip into the container to contact the expanded pellets at the upper end. The rate of flow is determined visually by observing the drops through the sight glass 141.

The density of the expanded pellets is controlled by governing the speed of the motor 108. This in turn controls the velocity of rotation of the feed screw 107 and the rate at which the pellets are introduced into the container 100. Speeding up the rotation of the feed screw 107 will likewise increase the flow through the expander and thereby increase the density of the expanded pellets. This speed control is readily effected to produce desired values of density, and is much easier to regulate than the intermixing of air and steam as previously used for pellet expanding devices. One of the great virtues of the design of this invention is the ability to expand the pellets uniformly and with a much greater control of density than heretofore possible.

Alternative to the feed screw 107 the pellets may enter the container 100 by other types of variable rate feed devices. One suitable unit is a vibrator that agitates a feed tube to slowly advance the unexpanded pellets toward the entrance to the container 100. Thus, as seen in FIG. 11 the feed tube 144 can be moved axially relative to the container 100 and agitated by means of a vibrator 145. Rubber cushion 146 cooperates with the magnet of the power unit to impart reciprocative movement to the feed tube 144. This movement of the tube causes unexpanded pellets to move forwardly and drop into the container 100. Variation of the speed of agitation will control the input of the pellets. The vibrator 145 generally is an electric unit of conventional design although mechanical vibrators can be used as well.

Rather than utilize a feed arrangement in which a hopper is intermittently supplied with unexpanded pellets, as for the supply hopper 111, a less complicated construction may be used also, as seen in FIGS. 12 and 13. Here the outlet tube 147 of the hopper 148 extends downwardly inside a funnel 149 that empties into the feed line 150. The hopper 148 may contain a substantial quantity of the unexpanded pellets which are allowed to run downwardly and out through the tube 147. It will be found that with the end of the tube 147 within the funnel 149 the unexpanded pellets will build up only to a certain level within the funnel but will not overflow. The approximate level of the pellets indicated by the dotted line 151. This provides a stead uninterrupted flow of the pellets, despite its simplicity and low cost construction.

When this type of pellet feed is utilized, it is preferred to include a shut-off valve in order to close the pellet supply to the expansion chamber. This allows the expander to exhaust itself of the pellets when it is necessary to shut down, so that the heated pellets will not clog up the equipment, as would occur if they could not be removed. The valve comprises a short tubular member 152 dimensioned to fit within the inlet conduit 150. The tube 152 has a longitudinally extending aperture 153 in its circumferential wall. An actuating lever 154 projects radially from one end of the tube 152 and outwardly through a slot in the inlet tube. When the valve is open the aperture 153 is positioned immediately below the funnel 149 so that the unexpanded pellets are free to drop within the feed screw area and be moved into the expansion chamber. To close the valve, the lever 154 is rotated to where the opening 153 no longer communicates with the funnel, and the pellet supply is shut off by the circumferential wall of the tube 152. Thus, an instant cutoff of the pellet feed may be accomplished by the valve member 152.

While the invention has been described with the various automatic controls operated by electrical means, other sources of power could be utilized as well. In particular, various of the valves may be pneumatically driven advantageously.

It can be seen from the above description that we have provided a device for expansible particulate material which permits foam plastic pellets to be expanded rapidly to precisely the density needed for any situation. The manufacture of articles from foam plastic pellets can be accomplished by automatic machinery with temperatures and pressures as well as all other operations closely controlled. Upon change of any parameter governing the molding equipment, the quality of the end product will be caused to suffer. Of all the factors involved, pellet density has been the most difficult to control. The present invention, therefore, allows true automation of the entire manufacturing process by assuring exact pellet density for the molding equipment.

The foregoing detailed description is to be clearly understood as given by way of illustration and example only, the spirit and scope of this invention being limited solely by the appended claims.

We claim:

1. A device for expanding a plurality of heat-expansible foam plastic pellets comprising
 a chamber,
  said chamber having a substantially flat horizontal bottom wall, and a wall portion adjacent said bottom wall,
inlet means for said chamber for substantially continuously introducing unexpanded pellets into said chamber,
an agitator in said chamber for mixing pellets so introduced,
said agitator including an elongated member having an edge closely spaced from said bottom wall and rotatable about said bottom wall,
an outlet from said chamber for removing expanded pellets therefrom,
and a source of dry heat for raising the temperature of said pellets in said chamber to cause expansion thereof,
said source of dry heat including means for heating said wall portion of said chamber adjacent said bottom wall,
and for maintaining said wall portion at a temperature above the temperature of said bottom wall.

2. A device for expanding a plurality of heat-expansible foam plastic pellets comprising
an elongated chamber having
a substantially flat horizontal lower end wall,
wall portions adjacent said lower end wall,
an inlet for unexpanded pellets adjacent said lower end wall,
and an outlet for expanded pellets at the opposite end portion of said chamber,
means for heating said wall portions of said chamber adjacent said lower end wall,
a rotatable shaft extending longitudinally into said chamber,
a plurality of arms carried by said shaft and projecting outwardly therefrom,
said arms including elongated blades projecting radially from said shaft at spaced intervals,
said blades being substantially horizontal adjacent said shaft and being twisted progressively toward the tip ends thereof to provide leading edges in the direction of rotation of said shaft that are lower than the trailing edges of said blades,
a plurality of fixed arms in said chamber for cooperating with said arms on said shaft for agitating said pellets,
and means for heating at least some of said arms.

3. A device as recited in claim 2 in which said blades are inclined at the tip ends thereof at an angle of approximately 15° with respect to the horizontal.

4. A device for expanding a plurality of heat-expansible foam plastic pellets comprising
an elongated cylindrical chamber
having a substantially flat horizontal lower end wall,
an inlet for unexpanded pellets in the circumferential wall of said chamber adjacent said lower end wall,
said chamber having an outlet for expanded pellets at the opposite end thereof,
means for heating circumferential wall portions of said chamber adjacent said lower end wall for transmitting heat to pellets in said chamber and causing expansion thereof,
a shaft extending axially into said chamber,
means for rotating said shaft in one direction,
blade means carried by said shaft,
said blade means including pair of blades extending in opposite radial directions from the lower end of said shaft to said circumferential wall,
each of said blades having substantially flat vertical surfaces,
a lower edge in juxtaposition with said lower end wall,
and tapering in width from said shaft to said circumferential wall,
said blade means including additional pairs of oppositely radially extending blades at spaced intervals above said blades at said lower end of said shaft,
said blades of said additional pairs being substantially horizontal adjacent said shaft,
and transversely twisted progressively to the to the tip ends thereof adjacent said circumferential wall to provide a leading edge in the direction of rotation of said shaft lower than the trailing edge thereof,
and a plurality of horizontally extending fixed rods extending across said chamber as chords thereof intermediate said blades,
at least some of said rods adjacent said lower end wall being heated.

5. A device as recited in claim 4 including in addition controllable means for introducing relatively small quantities of moisture into the upper end of said chamber
for reducing the charge of static electricity of expanded pellets adjacent said outlet.

References Cited by the Examiner

UNITED STATES PATENTS

| | | | |
|---|---|---|---|
| 312,612 | 2/1885 | Copeland | 99—238.5 X |
| 858,317 | 6/1907 | Young et al. | |
| 1,220,131 | 3/1917 | Jenkins | 263—26 X |
| 1,779,571 | 10/1930 | Ullgren | 263—26 X |
| 2,150,888 | 3/1939 | Barnard | 99—238.1 X |
| 2,255,986 | 9/1941 | Rapisarda | 99—236 X |
| 2,185,878 | 1/1940 | Adams et al. | |
| 2,254,271 | 9/1941 | Cretors | 99—238.5 X |
| 2,477,416 | 7/1949 | Page | 99—238.1 |
| 2,521,190 | 9/1950 | Stafford et al. | 263—21 |
| 2,549,449 | 4/1951 | Gibson | 99—238.5 |
| 2,604,030 | 7/1952 | Cretors | 99—238.5 |
| 2,777,599 | 1/1957 | Waas | 99—238.1 X |
| 2,851,940 | 9/1958 | Bleach | 99—238.1 |
| 2,855,191 | 10/1958 | Blaha | 263—21 |
| 2,934,328 | 4/1960 | Zvejnieks | 263—4 |
| 3,023,175 | 2/1962 | Rodman | 259—8 X |
| 3,099,045 | 7/1963 | Honkanen | 264—51 X |
| 3,126,432 | 3/1964 | Schuur | 264—53 |
| 3,132,846 | 5/1964 | Siddall | 263—21 |
| 3,147,321 | 9/1964 | Oswald et al. | 264—53 |
| 3,162,704 | 12/1964 | Attanasio et al. | 264—63 |
| 3,162,705 | 12/1964 | Smucker et al. | 264—53 |

JOHN J. CAMBY, *Primary Examiner.*

ROBERT F. WHITE, WILLIAM F. O'DEA, *Examiners.*

P. E. ANDERSON, *Assistant Examiner.*